United States Patent [19]

Curtin

[11] 4,355,207
[45] Oct. 19, 1982

[54] TELEPHONE ANSWERING SYSTEM

[75] Inventor: William J. Curtin, Madison, Wis.

[73] Assignee: Amtel Communications, Inc., Madison, Wis.

[21] Appl. No.: 154,914

[22] Filed: May 30, 1980

[51] Int. Cl.$^3$ .............................................. H04M 3/50
[52] U.S. Cl. .......................... 179/18 FC; 179/18 FH; 179/27 FH
[58] Field of Search ............. 179/27 FH, 27 D, 27 A, 179/27 FG, 27 FF, 27 FB, 27 F, 18 FC, 18 BE, 18 FH, 5.5, 5 R, 27 DB, 84 B, 18 BG

[56] References Cited

U.S. PATENT DOCUMENTS

| | | | |
|---|---|---|---|
| 3,334,191 | 8/1967 | Arseneau et al. | 179/27 D |
| 3,335,231 | 8/1967 | Gray et al. | 179/27 D |

FOREIGN PATENT DOCUMENTS 2536850 3/1977 Fed. Rep. of Germany ....... 179/5.5

OTHER PUBLICATIONS

"Telesignal Will Put You in the Black!", brochure, The Telesignal System, 1953.
"Intercepting Service for Strowger Automatic Telephone Systems", by H. A. Diezel, *The Automatic Electric Technical Journal*, vol. 1, No. 4, Apr. 1949, pp. 135-139.
"Telephone Answering Services", by Watson and Weinberg, *Bell Laboratories Record*, vol. 43, No. 11, Dec. 1965, pp. 447-450.
"The GTD-120 Centralized Attendent Service Digital PABX", by C. J. Garay, *GTE Automatic Electric Journal*, Jan. 1978, pp. 2-10.

*Primary Examiner*—Thomas W. Brown
*Attorney, Agent, or Firm*—LeBlanc, Nolan, Shur & Nies

[57] ABSTRACT

The telephone answering system includes a call concentrator capable of coupling a plurality of subscriber telephone lines to a single answering station. The concentrator is coupled to the plurality of subscriber lines and transfers calls to such lines one at a time through a single talk path that is connected to the answering station. In addition, over the same single talk path all identification information and communication between the operator and the concentrator is transmitted. Prior to transferring calls from the subscriber lines to the answering station audible identification information is provided to the operator at the answering station. The operator can selectively choose to receive only the identification signal or the identification signal immediately followed by the call to the subscriber line. If a call to one of the subscriber lines is already coupled to the answering station then additional incoming calls are placed on hold and subsequently transferred one at a time to the answering station. The remote hold device will answer such additional incoming calls with a preprogramed message and then place the call on hold until the line to the answering station is free to receive the next call. Upon command from the operator, the next awaiting call will be coupled through the single talk line to the answering station.

19 Claims, 4 Drawing Figures

Fig. 4
PRIOR ART

TELEPHONE ANSWERING SYSTEM

BACKGROUND OF THE INVENTION

The present invention relates to a telephone answering system including a telephone line concentrator for concentrating calls from a plurality of subscriber lines to an answering station.

For many years now it has been common practice for answering services to service a large plurality of subscriber lines at times selected by the subscriber. Such telephone answering services answer calls to the subscriber lines either at preselected times selected by the subscriber or if the incoming call to the subscriber line rings more than a predetermined number of times. Under such situations, the call is then taken by the operator at the remote answering station due to the current unavailability of the subscriber.

For this purpose, a plurality of subscriber lines within the same central office are coupled to a concentrator for concentrating all of the incoming calls from the subscriber lines. The answering station is then coupled to the concentrator by a plurality of dedicated lines. Each line includes two wires extending from the concentrator to the answering station. Such dedicated lines are direct connections especially made between the concentrator and the answering station. Typically a plurality of such lines are connected between the locations for serving as talk paths. In addition, at least one data communication line is connected between the concentrator and the answering station. Identification information is transmitted over the data communications line. Such identification information identifies the particular subscriber line to which an incoming call was directed so that the operator knows which subscriber line the operator is answering.

Typically, the identification information for all calls that have been received by the concentrator is immediately transmitted to the answering station where such information is maintained. It is common to display all of the identification information for the calls awaiting answering on a video screen with the operator then being able to select the calls one at a time for answering. While it is common to use a video screen presenting all of the identification information concerning all of the calls awaiting answering, such identification information has also been conveyed to a loudspeaker in the room so that the information can be heard by the operator. This latter type of system has been used where the operators answering the phones were blind.

Exemplary of the types of telephone answering systems including concentrators that have typically been utilized within the prior art are those systems disclosed by U.S. Pat. Nos. 2,971,061, 3,002,054 and 3,987,252. Each of these patents discloses a system in which the concentrator of the answering system is coupled to a plurality of subscriber lines and a plurality of output lines are coupled from the concentrator to the answering station. As indicated in U.S. Pat. No. 2,971,061 to Judy, data between the concentrator and the answering service is transmitted over a separate line so as to notify the answering service that a call is being received by the subscriber. In U.S. Pat. No. 3,002, 054 to Krom, a telephone answering system is disclosed in which a minimum of four trunk pairs of lines are connected between the central office which serves as a concentrator and the answering service center. Of the four trunk lines, three of the lines are used for the interchange of timing and control signals while the fourth line serves as a talking path to connect the answering center operator with any subscriber line to which a call is currently directed. In U.S. Pat. No. 3,987,252, a telephone answering system is disclosed that has eight lines interconnecting each of the concentrators to the central answering location.

Another patent in which a telephone answering system is disclosed which includes an arrangement for operating a call announcer to announce a fixed arbitrary character is U.S. Pat. No. 2,314,990 to Kessler. In the answering system disclosed by such patent, a plurality of trunk lines including indicator trunk lines are connected between the central office and the answering service. The system includes a call register-announcer device that is adapted to first register and then to announce or display the called telephone number to the selected operator position and to identify the calling cord circuit of the switchboard in the associated group. The operator at the selected operator position can then set up the call as announced by way of the plug terminating the calling cord circuit and the jack terminating the called line. The connection is then established and the call is answered.

Figure 4:
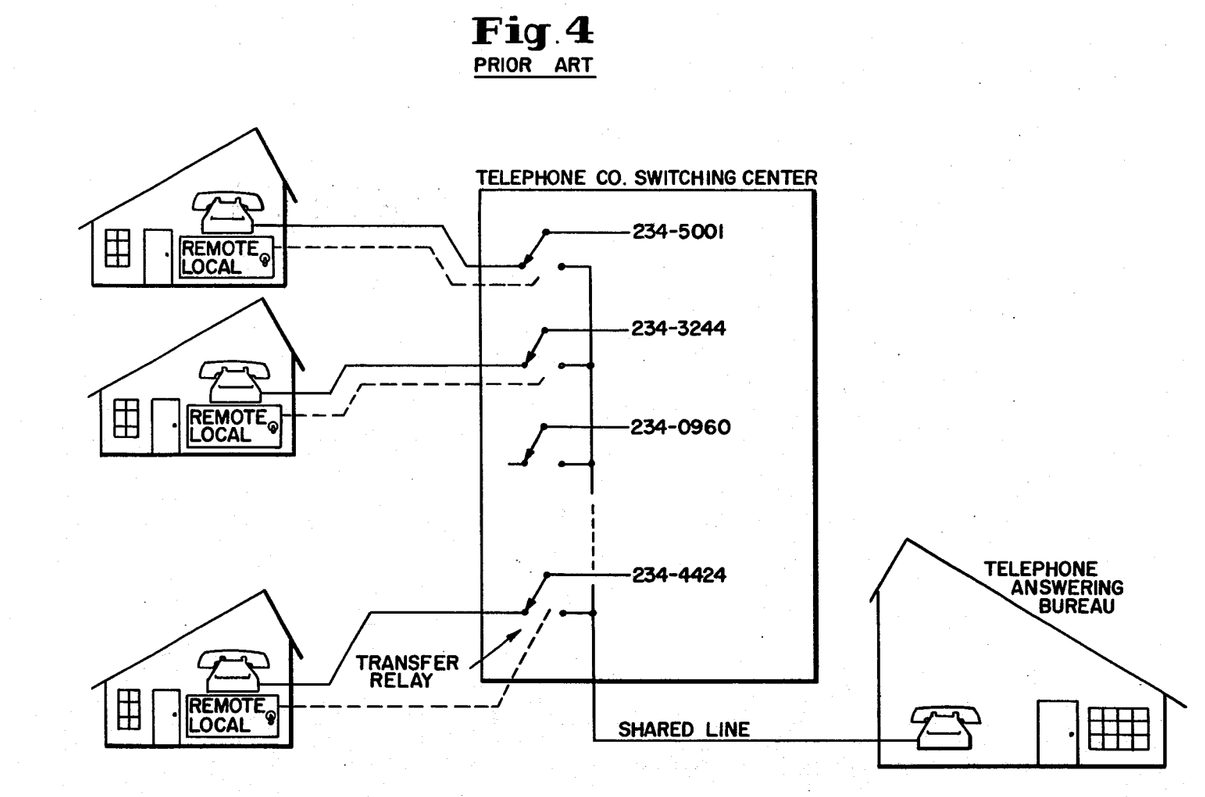
FIG. 4 is a schematic illustration of a shared line system of the prior art.

An answering service system that utilized only a single line between the telephone company switching center and the telephone answering bureau that has been tried in the past is a shared line system. Such a system is illustrated in FIG. 4 of the drawings. A shared line system is a telephone rented from the telephone company by the telephone answering service for transfer of subscribers lines. A subscriber wishing to have his telephone answered on this system must have a transfer switch on or near his residence or office telephone. When the switch is thrown, the telephone no longer rings at the premise of the subscriber. Instead, the subscriber telephone rings the telephone that is rented to the answering service through a transfer relay located in the telephone company. While many subscribers can be handled over such a shared line system, the answering service may only handle one call at a time. If one call is connected to the answering service then any subsequent callers to any of the other subscribers receive a busy signal. In essence, such an arrangement forms a special shared party line.

Another type of answering service system is one where the calls to the subscriber lines are diverted to a telephone answering system, often referred to as TAS, such as shown in U.S. Pat. No. 3,704,346. In the system disclosed an identification code can be sent to the second line answering the call.

SUMMARY OF THE INVENTION

An object of the present invention is to provide an improved telephone answering system.

Another object of the present invention is to provide a telephone answering system in which a concentrator is connected to a plurality of subscriber lines and concentrates calls to such lines for transmission to a telephone answering service over a single telephone circuit.

A further object of the present invention is to provide a telephone answering system in which a concentrator transfers calls to any one of the subscriber lines to a telephone answering service over a single telephone circuit with such calls being transferred one at a time and other calls awaiting transfer being placed on hold by the concentrator.

Still another object of the present invention is to provide a telephone answering system in which a single talk line couples the concentrator to the telephone answering service and such single telephone circuit also serves to carry identification information that identifies the subscriber line being called from the concentrator to the telephone answering service.

Still a further object of the present invention is to provide an improved telephone answering system in which the concentrator transmits over a single telephone circuit audible identification information for identifying the subscriber call to which the answering service is to be connected followed by connection to such call.

A still further object of the present invention is to provide an improved telephone answering system in which a plurality of subscriber lines are coupled to a telephone answering service through a concentrator over a single telephone circuit where when one call is already coupled to the answering service, additional calls to other subscriber lines are answered by the concentrator, a preprogramed message is repeated to the callers and such calls are placed on hold for subsequent coupling to the telephone answering service.

Still another object of the present invention is to provide an improved telephone answering concentrator that includes a mechanism for expanding telephone answering bureau services efficiently and economically.

A still further object of the present invention is to provide an improved concentrator for a telephone answering system that utilizes a common path for account identification, concentrator control and caller/operator communications.

Still another object of the present invention is to provide an improved concentrator for a telephone answering system that transmits a call waiting signal to the operator when a call has been placed on hold.

All of the above objectives are achieved by the utilization of the telephone answering system of the present invention. The telephone answering system includes an concentrator system that has two major sections. The first section is a control section that includes a microprocessor, instructional read only memory and a random access scratch pad memory and peripheral interface circuitry. The second major section is a line multiplexer section that includes subscriber line bridge relays that form part of the subscriber interfaces, call hold networks, ring voltage sensors, DTMF (dual tone multifrequency) detectors and a speech synthesizer.

Under instructions from the read only memory, the microprocessor and the control section scans all of the ring voltage circuits that are within the subscriber interfaces for account activity. The ring voltages are then compared by the microprocessor with variable ring count threshold information contained in the random access memory. Such ring count threshold information can be changed by the operator at the answering station at any time. When the threshold is reached, the microprocessor causes the operator line relay to close, i.e. the operator line interface that is coupled to the telephone answering service (typically referred to as TAS) assumes an off-hook condition.

The line that is provided between the operator line interface in the concentrator and the telephone answering service can be either a dedicated telephone line or a business telephone line that is seized by the concentrator, dialing out the number of TAS; in the latter case, the concentrator includes a call diverting system. The dedicated line that does connect the two is equipped with automatic ring down and hence signals the answering bureau operator. After the operator responds by connecting to the line, the subscriber identity is retrieved. The retrieval of the subscriber identity is commanded by the operator through coded information supplied to the concentrator by pressing certain buttons on the push-button telephone at the answering service location. Hence, the operator's telephone transmits over the line connected to the concentrator encoded DTMF signals. This information is then decoded by the concentrator and in response the subscriber's identity is transmitted over the talk line to the operator. The operator can command the concentrator to identify, re-identify, connect or hold a call utilizing different signalling codes by pressing various buttons on the push-button phone. When the command is given to connect the caller to the subscriber line to the telephone answering system operator, the subscriber line bridge relays of the active line are enabled and a communication path is established between the caller and the operator.

More basically stated, the telephone answering system of the present invention includes a call concentrator that acts to concentrate a plurality of subscriber telephone lines through a single talk line to a single answering station. An operator at the answering station is capable of being connected to and answering telephone calls to any one of the plurality of subscriber lines. The concentrator includes an input section for coupling the concentrator to each of the plurality of subscriber telephone lines. An identification mechanism generates an identification signal identifying each of the subscriber lines when such line receives a call. This identification information along with the call can be coupled to the answering station through an output section of the concentrator. The identification information and the call is coupled to the answering station over the single talk line with the identification information first being transmitted before establishing a connection between the caller and the answering station.

The identification mechanism in the concentrator generates an audible designation that identifies the subscriber line from which a call is to be connected to the answering station. This designation is transmitted over the talk line and can be heard by an operator at the answering station. The identification information is generated by a speech synthesizer that has been actuated in response to coded information within the concentrator.

If one caller is already coupled to the answering station, a remote hold device answers incoming calls to other subscriber lines that are transferred to the concentrator and holds such calls for subsequent transfer to the answering station. When the remote hold device answers incoming calls transferred from the subscriber lines, a preprogramed message is repeated to the caller before placing the call on hold. This remote hold device only answers the calls when the number of rings on the subscriber line has exceeded a preselected number, thereby being indicative that the operator has been unable to answer the line. Normally such inability to answer the line will be due to the operator already being coupled to a caller from another subscriber line.

The output interface allows the operator at the answering station to select for reception either the identification signal or the identification signal immediately followed by connection to the call transferred from the corresponding subscriber line. If the operator selects to only receive the identification signal, then a separate command can subsequently be sent by the operator to the concentrator for connecting the answering station to the corresponding subscriber line for receiving the call being transferred.

When the remote hold device has placed calls on hold, intermittent signals can be transmitted over the single talk line for alerting the operator that other calls are awaiting answering. Should the operator be unable to respond immediately to a call, the control section of the concentrator will intercede. Under directions received from the microprocessor, the speech synthesizer is coupled through the subscriber line bridging relays to the calling party. After a synthesized message is transmitted to the calling party, the subscriber hold relay engages the hold network and the subscriber line bridging relays are opened. The caller is then placed on hold. If the operator is already engaged in a conversation with another call when a second call is registered, an alert signal is supplied along the single talk line to the operator. The alert signal is an intermittent signal that can be either a single signal or a periodic signal. The on-going call can be momentarily interrupted and a signal interjected by the encoder into the operator's communication path so as to provide an indication of which subscriber line awaits answering.

Other standard features of telephone answering systems also can be incorporated with the concentrator of the present invention. Thus, this system can allow for the answering operator to verify and adjust the ring count thresholds, perform status tests of individual subscriber lines and associated circuitry, reinitialize the operation of the concentrator and initiate other tasks by going off-hook (connecting to the concentrator operator talk line). Going off-hook at one end of a talk line equipped with automatic ring down causes ringing to occur at the far end. Through a ring voltage sensor similar to those bridging the subscriber lines, the concentrator can be forced to seize its end of the operator/concentrator communication link. At this time, the automatic ring down equipment removes ringing voltage from the concentrator and the audible feed back to the operator, then substitutes an audio path giving the operator complete access to the system.

The following provides a brief description of several exemplary operations that can be carried out with the telephone answering system of the present invention. When the operator is not tied up with a prior call and a call is received on one of the subscriber lines, the operator's telephone at the answering station will ring. The operator then can answer such phone by going off hook and pressing a code on the push button telephone at the answering location. By pressing the appropriate code on the push button telephone, the operator can choose either to receive merely the identity of the call or to receive the identity immediately followed by being connected to the call. In either case, the concentrator will transmit over the single talk line that interconnects the concentrator with the answering station coded identification information that indicates the subscriber line being answered. Such coded information can be a numerical code that corresponds to the particular subscriber line receiving a call. If the operator selects to receive just the identity of the call, the operator then can subsequently select to answer the call by pressing a different code on the push button phone. After the operator converses with the caller, the operator will hand up the phone after transmitting a signal over the line to the concentrator to hang up the subscriber's line.

Alternatively, if the operator is already in the process of conversing with a prior caller, the concentrator with transmit an alert signal across the single talk line to the operator so as to alert the operator that there is a call awaiting answering. In the meantime, the concentrator will place the other incoming call on remote hold after first repeating a message to the caller. The information in the message can be either standard information which is built into the read only memory or different information for each of the subscriber lines which is stored within the memory.

The third possible operation is where the operator is conversing with a caller when a new call comes in but the operator decides to place the present call on hand. When the operator receives an alert signal indicating that there is another call awaiting answering, the operator can put the present call on hold, and obtain from the concentrator the identity of the subscriber line receiving the new call. The operator then can connect to the new caller or return to the prior caller. Upon completing the call, the operator can then be connected to the next call awaiting answering.

DESCRIPTION OF THE PREFERRED EMBODIMENTS

The concentrator of the telephone answering system is normally located at a location in close proximity to the telephone office in which a plurality of subscriber lines are located. The concentrator is then connected to each of the subscriber lines to be handled by the telephone answering system through subscriber interfaces such as interfaces 2 and 4 shown in FIG. 1. Interface 2 is connected to a subscriber telephone line 6 and interface 4 is connected to subscriber telephone line 8. In the embodiment illustrated in the figures and discussed herein there are fifteen subscriber interfaces. However, the concentrator can be constructed so as to receive either more or less than fifteen subscriber lines. Each subscriber line, however, is connected to a separate interface in the concentrator.

Figure 3:
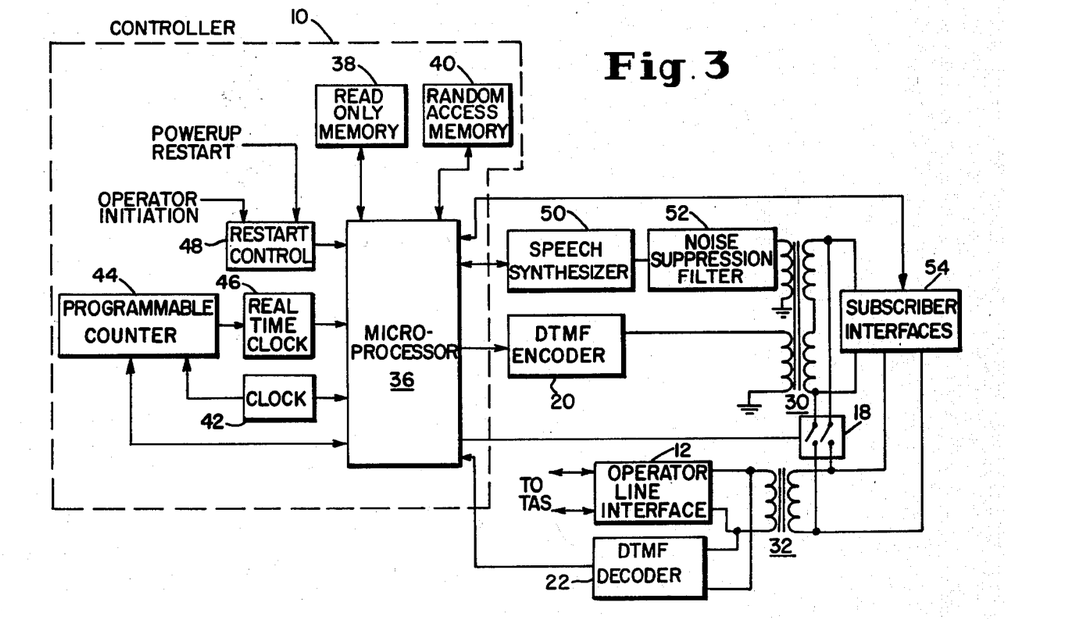
FIG. 3 is a more detailed block circuit diagram of the concentrator specifically illustrating the basic components of the controller of the concentrator.

The operations of the concentrator are carried out by a controller 10, such as shown in FIG. 3. Calls that are received by any of the subscriber lines are coupled one at a time to an operator line interface 12 that establishes an audio path along a single talk line 14 that connects the concentrator to the answering station. Line 14 is provided with automatic ring-down which is conventional within the art.

If one call is already coupled to the telephone answering station and a new call is received, a message is transmitted to the new caller which message is generated by speech synthesizer 16. As further explained below the speech synthesizer is controlled by the controller. In addition, the speech synthesizer is capable of being connected to the single talk path through an operator/synthesizer link cross-connect 18 for the purpose of transmitting coded information to the operator for identifying the subscriber line receiving the incoming call to which the operator is going to be connected. In order for the operator to select what information to receive or to place certain calls on hold, coded information is transmitted over line 14 by the operator by the pressing of certain buttons on the operator's push-button phone. Such information is decoded by the DTMF (dual tone multifrequency) decoder 22. The decoded signals are then transferred to controller 10. Similarly any coded information that is to be sent to the subscriber lines is encoded by DTMF encoder 20 (shown in FIG. 3).

When one of the subscriber lines receives a call, ring sensor 24 of the subscriber interface (see FIG. 2) senses the rings. The number of rings on sensor 24 is compared with a threshold level that is stored within one of the memory circuits. The comparison operation is carried out in the microprocessor of controller 10. If the call is to be placed on hold, then a hold relay is closed by controller 10 so as to close hold circuit 26 in the subscriber interface. If the call is to be connected to the operator line interface 12 then the appropriate relays in the subscriber line bridging relays 25 are closed in response to signals received from controller 10.

Figure 2:
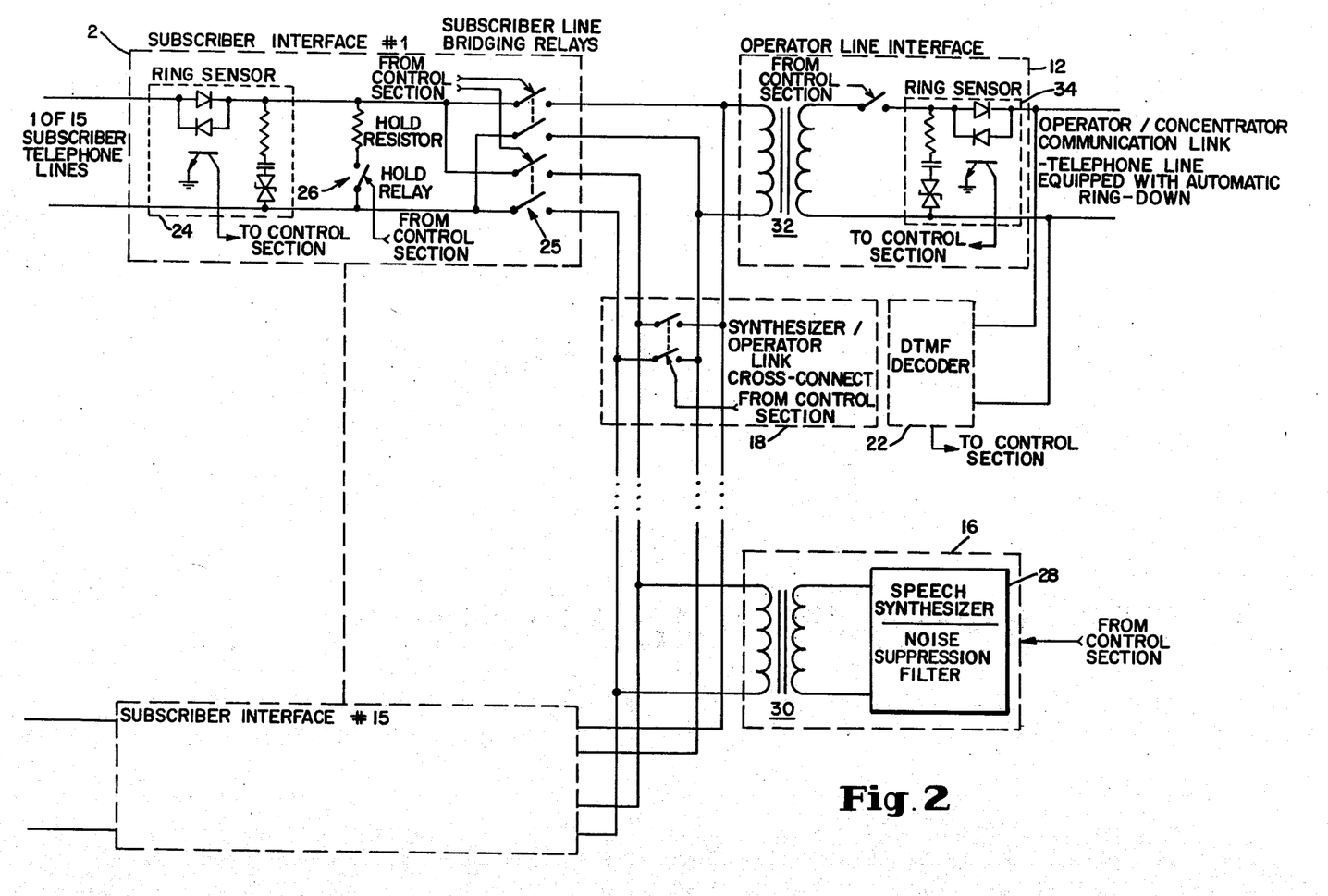
FIG. 2 is a block circuit diagram of a portion of the concentrator of the present invention with certain of the blocks illustrating some of the details of the system.

When the call is to be placed on hold, a message is transmitted to the caller. The contents of the message are stored within the memory of the controller 10. The stored message can be either a single message for all subscriber lines or a separate message for each line. When called upon, the stored information transmits appropriate signals to speech synthesizing circuit 16. Circuit 16 includes a speech synthesizer and noise suppression filter 28, which generates the audible message, and a transformer 30. The audible message is then transferred through the first transformer 30 to the subscriber lines. In order to receive such message, the appropriate relays of bridging relays 25 are closed so that the message is fed back through the subscriber interface to the caller. After the message is transmitted, the relays of bridging relays 25 are opened and holding circuit 26 is closed.

When the operator line is free, the concentrator rings the operator line by the automatic ring down. Once the operator picks up the telephone at TAS, the communication path between TAS and the concentrator is established. The operator then instructs the concentrator on the handling of the call. The control signals sent by the operator are decoded by DTMF decoder 22 which provides the control signals to controller 10.

In order to transmit audible identification information along line 14 to the operator, the controller operates speech synthesizing circuit 16 for formulating the audible information. Such information is then transferred to the lines connected to the operator interface by a link cross-connect 18. This audible information is then transferred by second transformer 32 to single talk line 14. After the operator receives the identification code, synthesizer/operator link cross-connect 18 is opened and the appropriate relays of bridging relays 25 are closed for connecting the caller to the subscriber line to be answered to transformer 32 for transmission along single talk line 14 that connects the concentrator to the answering station.

When the operator desires to manipulate or change the status of operation in the concentrator, the operator goes off-hook, thereby causing ringing of the line which is sensed by ring sensor 34 in the operator line interface 12. Ring sensor 34 then supplies an appropriate control signal to controller 10 indicating that the operator has picked up the line and the concentrator is prepared to receive instructions from the operator.

Turning the FIG. 3, a more detailed illustration of controller 10 can be seen. All of the operations of the concentrator are basically controlled by microprocessor 36. Certain permanent operational procedures are stored in read only memory 38. Other information for controlling the microprocessor and the other equipment in the concentrator is stored in random access memory 40. Exemplary of the type of information stored in random access memory 40 can be DTMF tone command queve, current relay status, and the ring count threshold (i.e. the number of rings that must occur on any one of the subscriber lines before such line is answered). A power supply, which has not been illustrated in the drawings, supplies power for all the elements in the concentrator. The timing of the operations of microprocessor 36 is controlled by block 42. Clock 42 also provides signals to programmable counter 44 which can be used for transmitting additional timing information after certain set time periods. In addition, a real time clock 46 can be utilized. All of the various counters and clocks provide different timing signals that can be used by microprocessor 36 as conventional within the art.

The real time clock 46 serves to interrupt the microprocessor and remind the machine to carry out another operation at set periodic times. This type of real time clock is typically utilized to ensure that the microprocessor does not remain lost in any particular position but continues to operate.

In order to further ensure proper operation of the microprocessor, a re-start control 48 can be employed. Re-start control 48 can be either automatically initiated or initiated by the operator. The reference to automatic initiation, generally known as power up re-start, refers to the input of a signal for resetting the system when the system has suffered a power failure and power is now starting up again. Alternatively, the operator can call the concentrator to check that the concentrator and the various subscriber lines are working. If the operator calls the concentrator and does not receive an appropriate answer from the concentrator within a certain number of rings then the system will re-start automatically. The rings on the operator interface are counted by the concentrator and if the operator line is not answered by the concentrator the concentrator provides a re-start signal. The re-starting of the system by re-start control 48 puts the system back in its initial position and re-starts all of the logic controls. While the microprocessor might have been lost in a certain operation, the re-starting of the system will take it out of that operation and reinitiate the entire operating procedure.

When messages are sent via the subscriber line interface or encoded information is to be transmitted to the operator, the microprocessor sends appropriate signals to the speech synthesizer. The speech synthesizer 50 then provides an output through noise suppression filter 52 across transformer 30. The signal going across transformer 30 can be supplied either to the subscriber interface for transmission to the caller or to transformer 32 for transmission of the identification information to the operator. In FIG. 3 the subscriber interfaces are collectively referred to by block 54.

The encoded information from DTMF encoder 20 is supplied to the operator interfaces through transformer 30. Encoder 20 can generate the call waiting signal to be sent over the talk line to the operator or can generate a signal to the operator that a certain code sent by the operator is incorrect. The decoding of information received from the operation line interface 12 is taken off from the output of such interface by DTMF decoder 22. The encoding of information is controlled by microprocessor 36 and similarly the decoded information is inputed into microprocessor 36.

Figure 1:
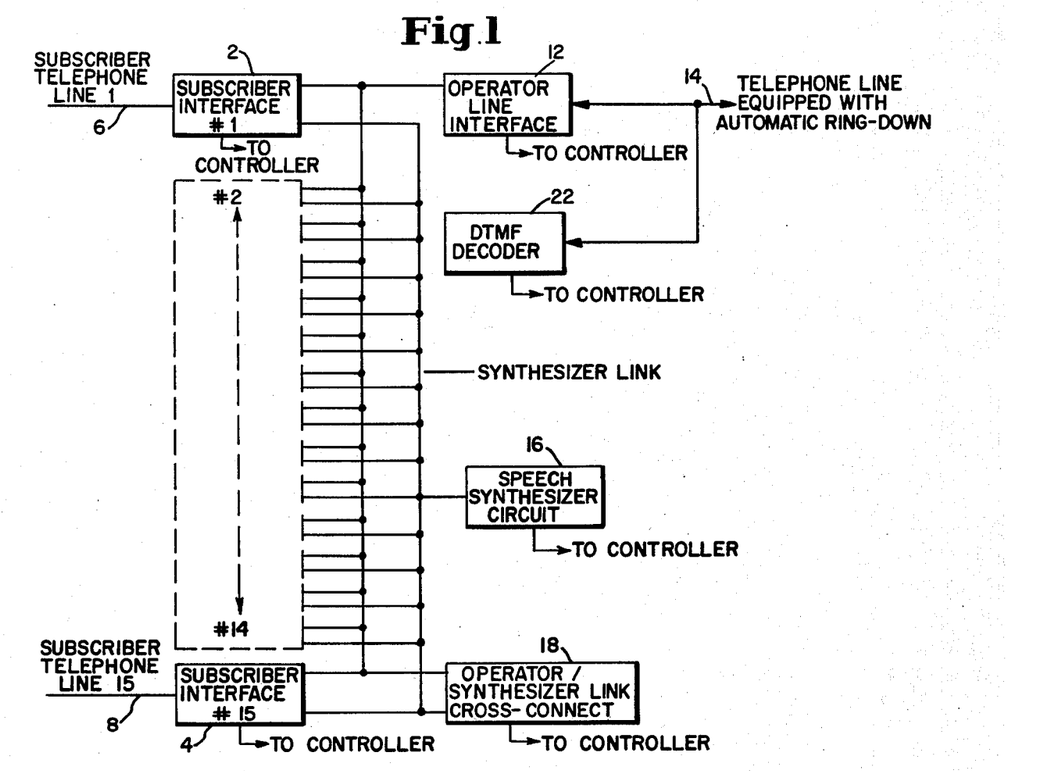
FIG. 1 is a simplified block circuit diagram of the telephone answering system of the present invention.

Several representative operations of the telephone answering system will now be described with reference to the equipment shown in FIGS. 1, 2 and 3. The controller with microprocessor 36 upon instructions from read only memory 38 scans all of the ring voltage circuits for any account activity. When a call is received by subscriber lines 2, ring sensor 24 senses the number of rings which are compared by microprocessor 36. When the number of rings have exceeded a certain threshold level, the operator line is seized and upon command of the operator the appropriate relay of bridging relays 25 is closed for connecting the caller on subscriber line 2 to the operator at line interface 12 if the operator is not already tied up with a previous call. When the call is to be received by the operator, upon demand by the operator the controller 10 first transmits coded information generated by speech synthesizer circuit 16 to the operator line interface. The information from speech synthesizer circuit 16 is transferred to transformer 32 by synthesizer/operator line cross-connect 18. After the signal identifying the subscriber line is transmitted along the single talk path 14 to the operator, speech/operator link cross-connect 18 is opened and the relays of bridging relays 25 for connecting the call to the operator are closed. The talk path is established between subscriber interface 2 and operator line interface 12 across transformer 32.

If the operator is already tied up with a previous call when a new call is received by subscriber interface 2 then the caller will receive a preprogramed message and be placed on hold. After subscriber interface 2 receives a number of rings above a predetermined threshold with the comparison being made by microprocessor 36, the appropriate relays of bridging relays 25 are closed so that the caller can receive a message from speech synthesizing circuit 16. Speech synthesizing circuit 16 generates the message in response to signals received from microprocessor 36. The signals for generating the message are stored in read only memory 38. After the message has been transferred to the caller, the bridging relays are opened and hold circuit 26 is closed so as to keep the caller on hold until the operator is available. When the operator is subsequently available, upon command by the operator the identification code will be transmitted to the operator and the connection then made such as in the manner previously discussed above.

The present invention may be embodied in other specific forms without departing from the spirit or essential characteristics thereof. The present embodiments are presented merely as illustrative and not restrictive with the scope of the invention being indicated by the attached claims rather than the foregoing description. All changes which come within the meaning and range of equivalency of the claims are therefore intended to be embraced therein.

What is claimed is:

1. A telephone answering system including a call concentrating means for concentrating a plurality of subscriber telephone lines coupled to said concentrating means through a single telephone circuit to a single answering station so that an operator at the answering station can be connected to and answer telephone calls to any one of the plurality of subscriber telephone lines, said concentrating means comprising: input means for coupling said concentrating means to a plurality of subscriber telephone lines; identifying means for generating an identification signal identifying each subscriber line when such line receives a call; output means for coupling said concentrating means to an answering station through a single telephone circuit with said identifying means first transmitting the identification for a subscriber line over the single telephone circuit before establishing a connection between a caller and the answering station, said output means allowing an operator at the answering station to select for reception between only the identification signal and the identification signal immediately followed by connection to the call coupled from the corresponding subscriber line; and remote hold means for answering incoming calls to the subscriber telephone lines that are coupled to said concentrating means and holding such calls when one of the other subscriber lines is already coupled to the answering station.

2. A telephone answering system according to claim 1 wherein said remote hold means answers incoming calls coupled from subscriber lines with a preprogramed message.

3. A telephone answering system according to claim 1 or 2 wherein said identifying means generates an audible designation that identifies the subscriber line from which a call is to be connected to the answering station, which designation is transmitted over the telephone circuit and can be heard by an operator at the answering station.

4. A telephone answering system according to claim 1 or 2 further comprising ring counting means for counting the number of rings of a call on a subscriber line being coupled to said concentrating means, said ring counting means having delay means for delaying answering of the call until there has been a preselected number of rings.

5. A telephone answering system according to claim 4 wherein said remote hold means only will answer a call on a subscriber line when the number of rings has exceeded the preselected ring count for such subscriber line.

6. A telephone answering system according to claim 1 or 2 further comprising alerting means for transmitting an intermittent signal over the single telephone circuit when a call on another subcriber line has been placed on hold by said remote hold means.

7. A concentrator system for concentrating a plurality of subscriber lines to a single telephone circuit connected to a telephone answering station so as to enable an operator at the telephone answering station to answer calls to such subscriber lines, said concentrator system comprising: input means coupled to each of the subscriber lines and having a separate ring voltage circuit associated with each subscriber line; scanning means for scanning all of said ring voltage circuits; comparing means for comparing the number of rings on each ring voltage circuit against a ring count threshold; coupling means for coupling an incoming call for one of the subscriber lines to the single telephone circuit to the answering station; and remote hold means for holding other incoming calls to subscriber lines when one call is already coupled by said coupling means to the answering station over the single telephone circuit.

8. A concentrator system according to claim 7 wherein said scanning means includes ring counting means for counting the number of rings of a call on a subscriber line being coupled to said concentrator system and said comparing means delays answering of the call until there has been a selected number of rings on said ring voltage circuit that exceeds a ring count threshold.

9. A concentrator system according to claim 7 wherein said remote hold means answers incoming calls transferred from the subscriber lines with a preprogrammed message.

10. A concentrator system according to claim 7 further comprising alerting means for transmitting an intermittent signal across the single telephone circuit when a call on another subscriber line has been placed on hold by said remote hold means.

11. A concentrator system according to claim 7, 8, 9 or 10 further comprising identifying means for generating an identification signal identifying each subscriber line when such line receives a call and coupling said identification signal to said coupling means for transmission to the answering station.

12. A concentrator system according to claim 11 wherein said identifying means includes speech synthesizing means coupled both to said coupling means for generating audible information in response to the identification signal for transmission to the answering station and to said remote hold means for generating an audible message for transmission to subscriber lines placed on hold by said remote hold means.

13. A concentrator system according to claim 12 wherein said speech synthesizing means transmits the audible identification information across the single telephone circuit through which calls to the subscriber lines that are received by said concentrator system are coupled to the answering station.

14. A concentrator system according to claim 13 wherein said coupling means enables an operator at the telephone answering station to select for reception between only the identification information and the identification information immediately followed by the corresponding call.

15. A telephone answering system including a concentrating means for concentrating a plurality of subscriber telephone lines through a single telephone circuit to a single answering station so that an operator at the answering station can be connected to and answer telephone calls to any one of the plurality of subscriber lines, said concentrating means comprising: a plurality of subscriber interface circuits, each of said subscriber interface circuits being associated with one of the subscriber lines and being coupled thereto, each of said subscriber interface circuits including ring sensing means for sensing the number of rings on the corresponding subscriber line when a call is received by such line; output coupling means for coupling calls to the subscriber lines to an answering station one call at a time through a single telephone circuit; control means coupled to said subscriber interface circuits for answering a call to any one of the subscriber lines when such call exceeds a preselected number of rings, said control means including identification means for generating an identification signal identifying each subscriber line when such line receives a call and remote hold means for answering incoming calls to the subscriber lines that are coupled to said concentrating means and holding such calls when one of the other subscriber lines is already coupled to the answering station by said output coupling means; and speech synthesizing means coupled to and functioning in conjunction with said control means for providing audible identification information in response to identification signals from said identification means and an audible message to be coupled to said subscriber interface circuits when subscriber lines are placed on hold by said remote hold means.

16. A telephone answering system according to claim 15 wherein said output coupling means is coupled to said control means and functions in conjunction therewith for allowing an operator at the answering station to select for reception between only the identification information and the identification information immediately followed by connection to the call transferred from the corresponding subscriber line.

17. A telephone answering system according to claim 16 wherein said ring sensing means is coupled to and functions in conjunction with said control means for controlling answering of a call so that such call is only answered after there has been a preselected number of rings.

18. A telephone answering system according to claim 15 or 16 wherein said control means further includes alerting means for transmitting an intermittent signal over the single telephone circuit when a call on another subscriber line has been placed on hold by said remote hold means.

19. A telephone answering system according to claim 18 wherein said ring sensing means is coupled to and functions in conjunction with said control means for controlling answering of a call so that such call is only answered after there has been a preselected number of rings.

* * * * *

UNITED STATES PATENT AND TRADEMARK OFFICE
CERTIFICATE OF CORRECTION

PATENT NO. : 4,355,207

DATED : October 19, 1982

INVENTOR(S) : William J. Curtin

It is certified that error appears in the above-identified patent and that said Letters Patent is hereby corrected as shown below:

Column 6, line 1, change "hand" to --hang--.

Column 6, line 16, change "hand" to --hold--.

Column 8, line 7, change "the" to --to--.

Column 8, line 22, change "block" to --clock--.

Column 9, line 7, change "operation" to --operator--.

Claim 3, column 10, line 35, delete the ",".

Claim 17, column 12, line 37, change "16" to --15--.

Signed and Sealed this

Twenty-sixth Day of April 1983

[SEAL]

Attest:

GERALD J. MOSSINGHOFF

Attesting Officer

Commissioner of Patents and Trademarks